United States Patent [19]

Wada et al.

[11] Patent Number: 4,541,047
[45] Date of Patent: Sep. 10, 1985

[54] PIPELINED DATA PROCESSING SYSTEM

[75] Inventors: Kenichi Wada, Zama; Yooichi Shintani, Kokubunji; Tsuguo Shimizu, Sayama; Akira Yamaoka, Hadano, all of Japan

[73] Assignee: Hitachi, Ltd., Tokyo, Japan

[21] Appl. No.: 490,166

[22] Filed: Apr. 29, 1983

[30] Foreign Application Priority Data

Apr. 30, 1982 [JP] Japan ................................. 57-71217

[51] Int. Cl.³ .............................................. G06F 9/38
[52] U.S. Cl. ................................................ 364/200
[58] Field of Search ......................... 364/200 MS File

[56] References Cited

U.S. PATENT DOCUMENTS

| 3,949,379 | 4/1976 | Ball | 364/200 |
| 4,112,489 | 9/1978 | Wood | 364/200 |
| 4,253,183 | 2/1981 | Taylor et al. | 364/200 |
| 4,399,507 | 8/1983 | Cosgrove et al. | 364/200 |

Primary Examiner—Raulfe B. Zache
Attorney, Agent, or Firm—Antonelli, Terry & Wands

[57] ABSTRACT

A data processing system for executing an instruction in a plurality of stages in a pipeline mode comprises a main operation unit for operating all instructions to be executed by the data processing unit, a first group of general purpose registers for storing the operation results of the main operation unit, a pre-operation unit for operating a portion of instructions which frequently appear and which can be operated with a small number of circuit components, a second group of general purpose registers for storing the operation results of the pre-operation unit, and control means for storing the operation result of the pre-operation unit into the second general purpose register at least one operation stage earlier than the storing of the operation result of the main operation unit into the first general purpose register and storing the contents of the second general purpose registers into the first general purpose registers when an interruption occurs.

6 Claims, 11 Drawing Figures

|   | 1 | 2 | 3 | 4 | 5 | 6 |
|---|---|---|---|---|---|---|
| D | 1 | 2 | 3 | 4 | 5 | 6 |
| A |   | 1 | 2 | 3 | 4 | 5 |
| L |   |   | 1 | 2 | 3 | 4 |
| E |   |   |   | 1 | 2 | 3 |
| P |   |   |   |   | 1 | 2 |

|   | L |   |   |   | A |   |   |   |   |   |
|---|---|---|---|---|---|---|---|---|---|---|
| D | 1 |   |   |   |   | 2 | 3 | 4 | 5 | 6 |
| A |   | 1 |   |   |   |   | 2 | 3 | 4 | 5 |
| L |   |   | 1 |   |   |   |   | 2 | 3 | 4 |
| E |   |   |   | 1 |   |   |   |   | 2 | 3 |
| P |   |   |   |   | 1 |   |   |   |   | 2 |

FIG. 9

|   | $C_1$ | $C_2$ | $C_3$ | $C_4$ |
|---|---|---|---|---|
| D | ① | ② | ③ | ④ |
| A |   | ① | ② | ③ |
| L |   |   | ① | ② |
| E |   |   |   | ① |
| P |   |   |   |   |

FIG. 10

|   | $C_1$ | $C_2$ | $C_3$ | $C_4$ | $C_5$ |
|---|---|---|---|---|---|
| D | ① | ② | ③ | ④ | ⑤ |
| A |   | ① | ② | ③ | ④ |
| L |   |   | ① | ② | ③ |
| E |   |   |   | ① | ② |
| P |   |   |   |   | ① |

FIG. 11

PIPELINED DATA PROCESSING SYSTEM

The present invention relates to a pipelined data processing system, and more particularly to a pipelined data processing system in which an instruction is executed in a plurality of stages each having an independent hardware and the stages are operated in an overlapped mode.

In a prior art pipelined data processing system, an instruction is executed in five to seven stages with each stage being operated in one machine cycle (basic cycle of the data processing system) and the stages being operated in an overlapped mode so that each instruction is apparently executed in one cycle.

By way of example, let us assume that an instruction is processed in five stages, that is, a D-stage in which the instruction is decoded and an operand address is determined by adding a content of a general purpose register designated by an index field of the instruction, a content of a general purpose register designated by a base field of the instruction and a content of a displacement field of the instruction; an A-stage in which the logical operation address determined in the D-stage is converted to a physical address actually used to access a memory; an L-stage in which an operand is fetched from a buffer memory which is a high speed memory containing a portion of data of a main memory, or from a general purpose register based on the physical address converted in the A-stage; an E-stage in which an operation is carried out using the operand fetched in the L-stage; and a P-stage in which an operation result is stored in the memory or the general purpose register. For example, the D-stage for an instruction ① is processed in one machine cycle of the data processing system and the A-stage for the instruction ① is processed in the next machine cycle and the D-stage for the succeeding instruction ② is simultaneously processed, and similarly the succeeding instructions ③ and ④ are executed simultaneously with the preceding instructions one stage later so that each instruction is effectively executed in one machine cycle. However, when the address for executing the current instruction is determined in accordance with a result of the execution of the preceding instruction such as when an L (load)-instruction to load a content of the memory to a register is followed by an A (add)-instruction to add an operand stored at an address specified by the content of the above register (this being called an address conflict), the D-stage for the current instruction cannot be executed until the D-stage for the preceding instruction has been completed. As a result, the execution is delayed and the performance of the data processing system is degraded.

Approaches to reduce such a delay have been proposed by Japanese Patent Publication No. 9088/82 and Japanese patent application No. 194002/81 (corresponding to U.S. Ser. No. 446,002) both filed by Hitachi Ltd., the same assignee as the present assignee, in which in addition to a main operation unit which can carry out operations required by any instruction, a pre-operation unit capable of carrying out only simple operations (many of the instructions which cause the address conflict such as the L-instruction and the A-instruction can be processed by an operation unit having a relatively small number of component circuits) is arranged in a vicinity of a hardware unit for the D-stage so that the operation result of the preceding instruction is produced earlier by the pre-operation unit and it is utilized to process the succeeding instruction. In this manner, the delay of the data processing due to the address conflict can be reduced. However, in the system disclosed in the Japanese Patent Publication No. 9088/82, a buffer memory for storing the output of the pre-operation unit is not provided and hence the pre-operation can be carried out only for the immediately preceding instruction to the current instruction. In the system disclosed in the Japanese patent application No. 194002/81, a buffer for storing the output of the pre-operation unit is provided but the buffer is separately arranged from a general purpose register. Accordingly, the number of circuit components required is large.

The Japanese patent application No. 71217/82 filed by the present assignee, Hitachi Ltd. discloses a data processing system in which operation results of the main operation unit and the pre-operation unit are stored in the same general purpose register so that the problems encountered in the Japanese Patent Publication No. 9058/82 and the Japanese patent application No. 194002/81 are resolved.

However, where the operation results of the main operation unit and the pre-operation unit are sent to the same general purpose register, the following problem is encountered.

When the operation results overflow a predetermined number of digits, it is necessary to interrupt a program to terminate the program. In this case, the interrupted program should be processed as suppression, termination or completion depending on the type of interruption. The completion means that the execution of the instruction is completed and the next instruction is terminated (interrupted) without being executed, and in the termination there is no assurance as to to which extent the instruction is executed before it is terminated.

Accordingly, in the prior art system, when the completion type interruption occurs, the next stage to the P-stage of the interrupting instruction and the P-stage of the next instruction are suppressed, and when the suppress/termination type interruption occurs, the P-stage of the interrupting instruction and the E-stage of the next instruction are suppressed in order to process the instruction required at the time of the interruption.

However, for the competion type interruption, the storing of the operation result into the general purpose register for the P-stage of the next instruction to the interrupting instruction is suppressed but the E-stage and the preceding stages are completed and hence the storing of the operation result into the general purpose register for the next instruction is completed when the stage is suppressed by the interruption. For the suppress type interruption, the P-stage of the interrupting instruction is suppressed but the E-stage and the preceding stages are completed and hence the storing of the operation result of the interrupting instruction into the general purpose register is completed when the stage is suppressed by the interruption as a result, when the interruption occurs, a content which is different from the expected content of general purpose register is stored in the general purpose register.

More particularly, since the storing of the operation result into the general purpose register occurs one stage earlier than the instruction execution stage which is suppressed by the interruption, the content of the general purpose register at the time when the stage is suppressed by the detection of the interruption is shifted by one instruction execution at maximum from the content of the general purpose register expected in a program.

It is an object of the present invention to provide a high processing speed pipeline controlled system which resolves the problems encountered in the prior art systems.

In accordance with one aspect of the present invention, general purpose registers (called GGPR) for storing the operation result in the P-stage of the instruction execution are provided in an execution unit including the main operation unit, in addition to general purpose registers (called IGPR) for storing the operation results of the pre-operation unit and the main operation unit, and the contents of the IGPR are updated in accordance with the contents of the GGPR in the hardware processing of the data processing system when the interruption occurs. Since the operation result of the instruction is stored in the GGPR in the P-stage, when the stage is suppressed by the interruption, the operation result of the next instruction to the interrupting instruction is not stored in the GGPR and, in the program, the operation results of the instructions to be executed following to the interruption are not stored in the GGPR. Accordingly, the content of the GGPR is that which is expected in the program even if the interruption occurs. Thus, by updating the contents of the IGPR in accordance with the contents of the GGPR when the interruption occurs, the contents of the IGPR are correct ones which are expected in the program.

In accordance with another aspect of the present invention, when the operation result of the instruction is stored in the IGPR, the content of the general purpose register before updating is evacuated and the evacuated data is written into the general purpose register in the hardware processing when the interruption occurs. Thus, the contents of the IGPR can be corrected to the ones expected in the program.

In accordance with the present invention, the instruction can be processed by the pre-operation unit and the writing to the general purpose register is speeded up. Therefore, a data processing system having an improved performance for the index/base register conflict can be provided.

The above and other features and advantages of the present invention will be apparent from the following description taken in conjunction with the accompanying drawings, in which:

One embodiment of the present invention is now explained. The present embodiment can execute instructions used in the IBM System/370 computer. The operation of this system is described in "IBM System/370 Principle of Operations" published by IBM. In the present specification, therefore, the explanation of the operation of the above system is omitted unless specifically needed and the terms used therein are used without explanation unless specifically needed. In the data processing system of the present invention, one instruction is executed in a plurality of stages and the instructions are executed in a pipeline fashion such that different stages for different instructions are executed in parallel. In the present embodiment, the stages D, A, L, E and P are executed as is done in the prior art.

Figure 1:
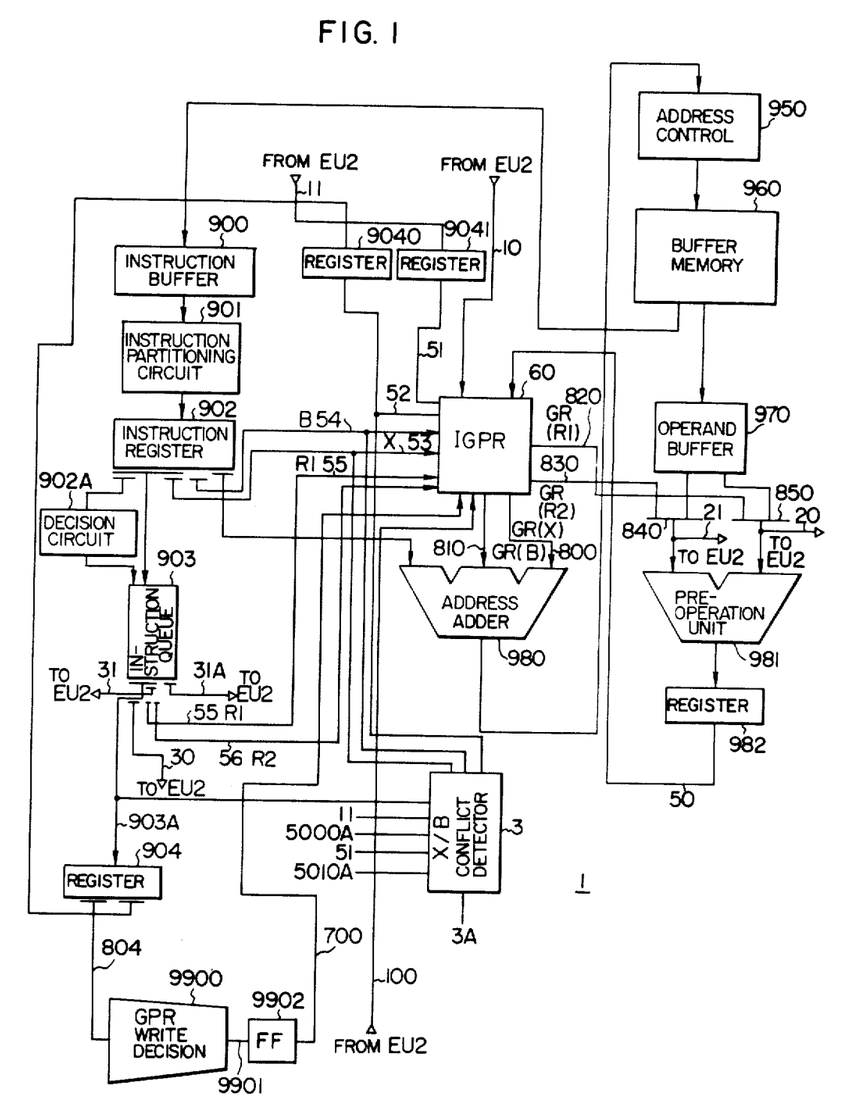
FIG. 1 shows a detail of an instruction unit in a first embodiment of a data processing system.
Figure 2:
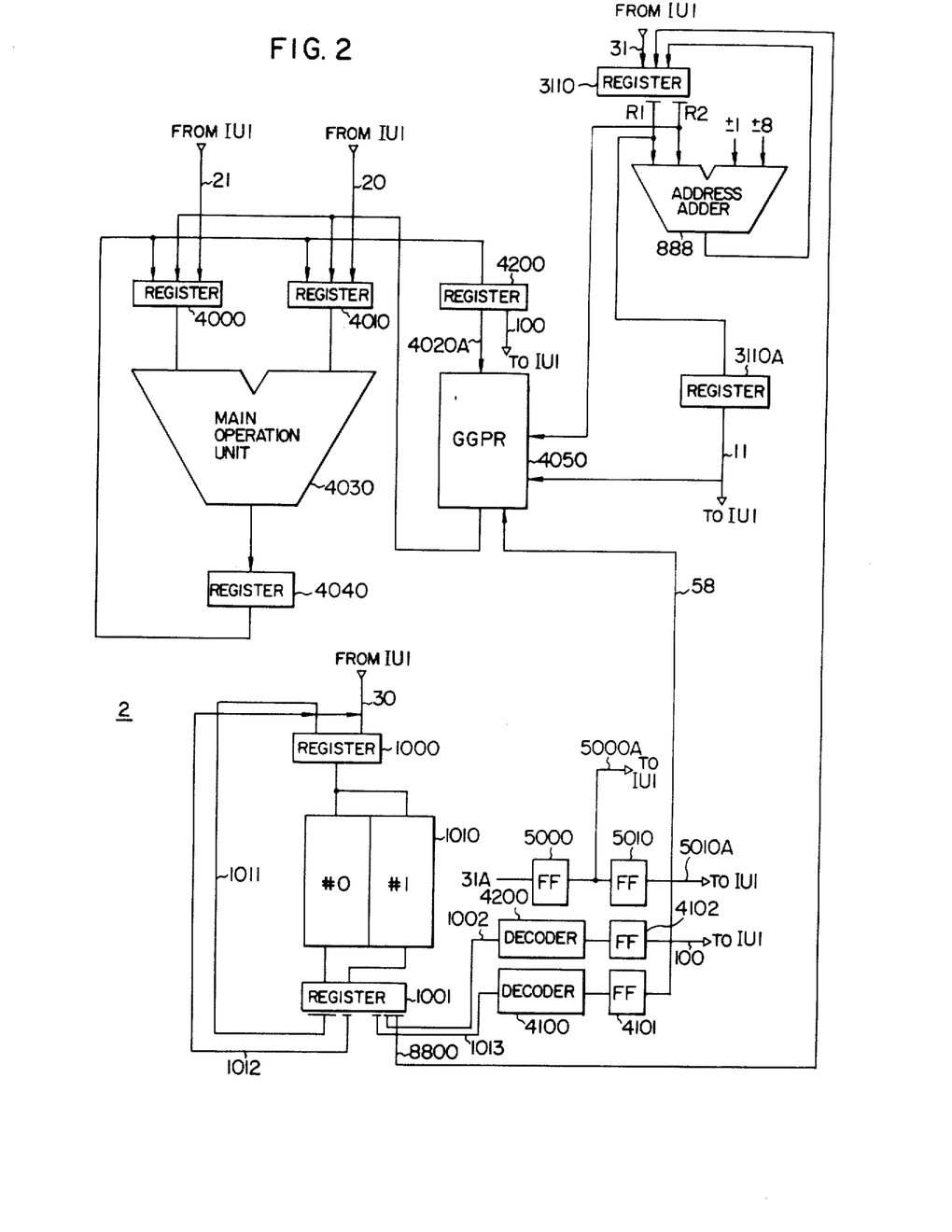
FIG. 2 shows a detail of an execution unit in the first embodimemt.
Figure 3:
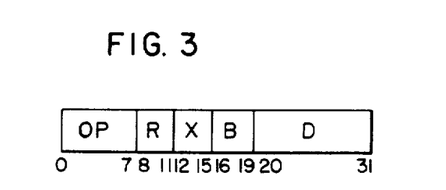
FIG. 3 shows an instruction format used in the data processing system.

FIG. 1 shows a configuration of an instruction unit (I-unit) 1 in the data processing system of the present invention, and FIG. 2 shows a configuration of an execution unit (E-unit) in the data processing system. In FIG. 1, numeral 960 denotes a buffer memory which is a high speed memory for temporarily storing data including instructions necessary for operation, of a content of a main memory (not shown), numeral 900 denotes an instruction buffer for temporarily storing instructions fetched from the buffer memory 960, numeral 901 denotes an instruction partitioning circuit for fetching an instruction from one word of instruction in the instruction buffer 900, and numeral 902 denotes an instruction register to which the instruction fetched by the instruction partitioning circuit 901 is loaded. The instructions used in the data processing system of the present embodiment are same as those used in the IBM System/370 computer and they are classified into several formats. For example, an RX format instruction shown in FIG. 3 is used. The RX format instruction has 32 bits (bit 0 to bit 31), of which the bits 0–7 are an operation code to represent a type of instruction such as A or L, the bits 8–11 are a register field (R) representing a register number of a general purpose register in which an operand to be read out for the operation is stored on a register in which an operation result is to be stored, the bits 12-15 and the bits 16-19 are an index field (X) and a base field (B), respectively, which represent register numbers of I general purpose registers (IGPR) 60 and G general purpose registers (GGPR) 4050 to be described later, which are used to calculate an operand address, and the bits 20–31 are a displacement field (D) which represents a displacement used to calculate the general purpose register number based on the index field and the base field. The RX format instruction includes the A-instruction and the L-instruction. One word of the instruction buffer 900 comprises 72 bits and contains one or more instructions. The instruction partitioning circuit 901 partitions an instruction to be fetched from one word of instruction in the instruction buffer 901.

Numeral 902A denotes a decision circuit which determines if the instructions stored in the instruction register 902 can be processed only by a main operation unit 4030 in the E-unit 2 shown in FIG. 2 and the operation results are to be stored in the IGPR 60, based on the operation codes of the instructions, and produces a "1" output if the decision is negative and "0" output if the descision is affirmative. Numeral 903 denotes an instruction queue register which sequentially stores first two bytes (bits 0–15) of instruction loaded in the instruction register 902 and the output of the decision circuit 902A to form an instruction execution quene, and numeral 904 denotes a work register in which the first two bytes of the instruction from the instruction quene register 903 are loaded. Numeral 9040 denotes a register in which an address of an operation result write register designated by the bits 8–11 of the instruction loaded in the register 904 is loaded, and numeral 9041 denotes a register in which an address of an operation result write register loaded in a register 3110 of FIG. 2 is loaded through a line 11.

Figure 4:
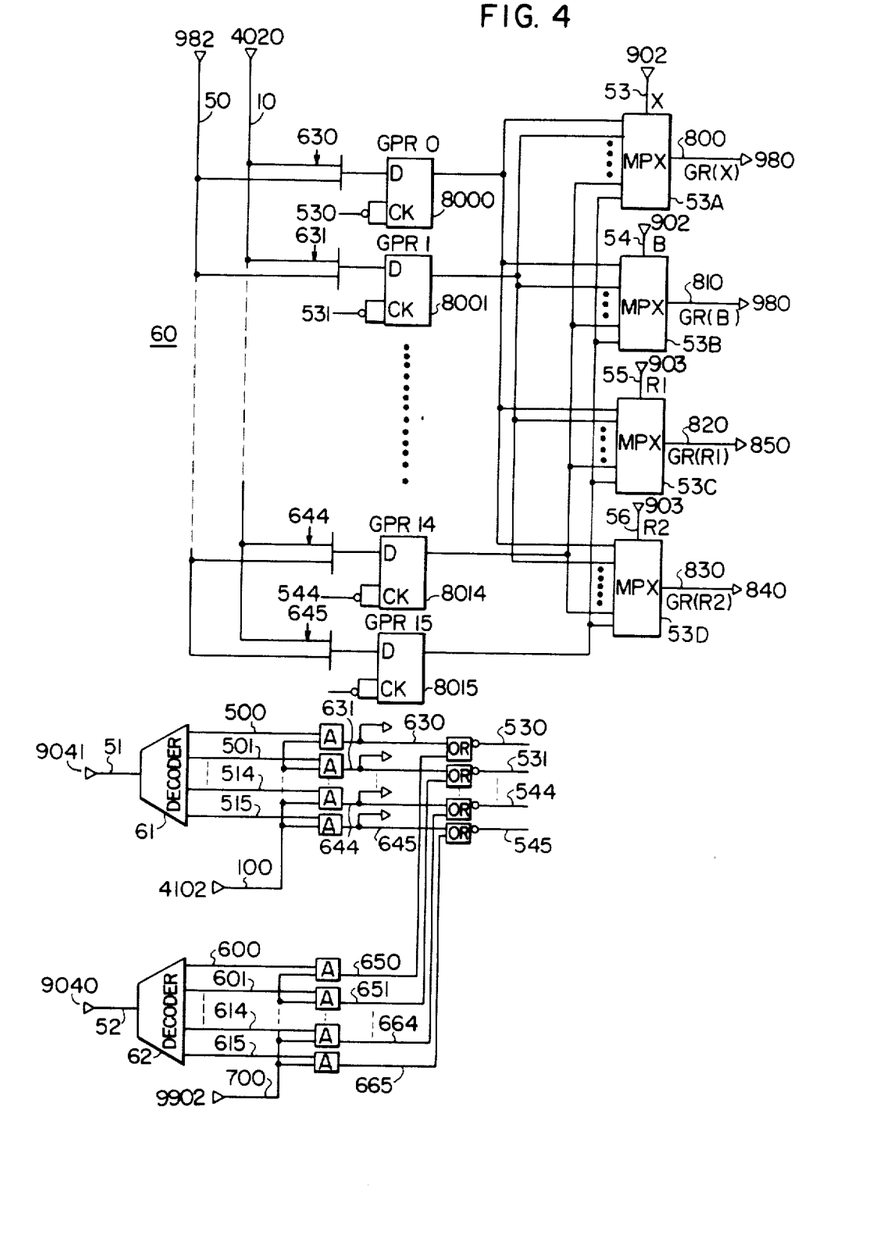
FIG. 4 shows a detail of IGPR shown in FIG. 1.

Numeral 3 denotes an X/B conflict detector which detects the index/base register conflict in which the index register numbers or the base register members of the preceding instruction and the succeeding instruction are equal, based on the contents of the registers 9040 and 9041 and the index field and the base field of the instruction loaded in the instruction register 902. Numeral 60 denotes the general purpose registers (GPR). In order to distinguish them from the general purpose registers 4050 in the E-unit 2 of FIG. 2, the GPR of the I-unit 1 in FIG. 1 are referred to as IGPR and the GPR of the E-unit 2 are referred to as GGPR. The GGPR 4050 are of the same construction as the IGPR 60 although it is not essential. The construction of the IGPR 60 is shown in FIG. 4 and it has sixteen general purpose registers 8000–8015.

Numeral 9900 denotes a decision circuit for determining from an operation code of the instruction loaded in the register 904 whether the instruction can be pre-operated by the pre-operation unit 981 and requests the storing of the operation result into the IGPR 60, and numeral 9902 denotes a flip-flop into which the output of the decision circuit 9900 is set. The output of the flip-flop 9902 is sent to the IGPR 60 as the IGPR write control request signal. It permits the storing of the operation result into the IGPR 60 when the instruction can be pre-operated and requests the writing of the operation result into the IGPR 60.

Numeral 950 denotes an address control which converts a logical address determined by the address calculation into a physical address for reading out the buffer memory 960 and controls the fetching of the operand stored in the buffer memory 960, and numeral 970 denotes an operand buffer for storing the operand fetched from the operand buffer 960. Numeral 840 denotes a selector for selecting one of the index operands from the IGPR 60 and the operand buffer 970, and numeral 850 denotes a selector for selecting one of the base operands from the IGPR 60 and the operand buffer 970. The pre-operation unit 981 carries out the pre-operation for the operands supplied from the selectors 840 and 850 based on the operation code of the instruction loaded in the register 904 and it can process only the instructions such as A, L and TM (test mode) instructions which frequently appear and which require relatively small number of circuit components for the processing. The operation result is loaded in the register 982, thence it is stored in the IGPR 60 through a line 50. The main operation unit 4030 in the E-unit 2 of FIG. 2 can carry out the operation for all instructions including M (multiply) and D (divice) instructions which require a large scale of arithmetic and logic unit. The operation result of the operation not carried out by the pre-operation unit 981 but carried out by the main operation unit 4030 is stored in the IGPR 60 through the line 10 from the register 4020 of the E-unit 2 as will be described later. Numeral 980 denotes an address adder which receives the bits 20–31 (displacement field D) of the instruction loaded in the instruction register 902, the base field data GR (B) from the IGPR 60 and the index field data GR (X) and adds them to produce an operand address. The output of the address adder 980 is supplied to the address control 950.

The operation code, the register and index field and the base and index field are supplied from the instruction queue 903 of the I-unit 1 of FIG. 1 to the E-unit 2 of FIG. 2 through lines 30, 31 and 31A, respectively, and the outputs of the selectors 840 and 850 are supplied to the pre-operation unit 981 and the E-unit 2 through lines 21 and 20, respectively. In the E-unit 2 of FIG. 2, numeral 1000 denotes a register in which the operation code from the instruction queue 903 of the I-unit 1 is loaded, and numeral 1010 (#0 and #1) denotes a control storage for storing microprograms. A microinstruction fetched from the control storage 1010 in accordance with an address specified by the operation code of the instruction loaded in the register 1000 is loaded in a register 1001. If the microinstruction fetched loaded in the register 1001 is not the last microinstruction for the instruction initially loaded in the register 1000, a portion of the content of the register 1001 is added to the content of the register 1000 through a line 1012 to specify an address of a microinstruction to be next fetched from the control storage 1010 so that the next instruction is loaded to the register 1001 and the microinstructions are sequentially fetched. If the instruction loaded in the register 1001 is the last microinstruction, an end bit (EOP) is loaded in the register 1000 through a line 1012 and the next instruction is loaded in the register 1000 from the instruction queue 903.

Numeral 4000 denotes a register in which the index operand from the selector 840 of the I-unit 1, or the index operand derived from the operation result of the operation unit 4050 or the data from the GGPR 4050 is loaded, and numeral 4010 denotes a register in which the base operand from the selector 850 of the I-unit 1, or the base operand derived from the operation result of the operation unit 4030 or the data from the GGPR 4050 is loaded. The operation result of the operation unit 4030 is stored in a register 4020. The operation unit 4030 carries out the operation on the index and base operands from the register 4000 and 4010 in accordance with the microinstruction loaded in the register 1001, and the operation result is stored in a register 4040. Numeral 3110 denotes a register for storing the bits 0–15 of the instruction from the instruction queue 903 of the I-unit 1, and numeral 888 denotes an address adder which receives the bits 8–11 (register field) and 12–15 bits (index field) of the instruction loaded in the register 3110 and information ±1 or ±8 to calculate an address. The calculated address is stored in the register 3110. The 8–11 bits of the register 3110 are supplied to the GGPR 4050 as read address information for the GGPR 4050 and the bits 12–15 are supplied, after having been loaded in a register 3110A, to the GGPR 4050 as write address control information for the GGPR 4050. The content of the register 3110A is supplied to the register 9041 and the comparator 904A of the I-unit 1 through a line 11.

The storing of the operation result of the main operation unit 4030 to the GGPR and the IGPR is controlled by the microinstruction. The main operation unit 4030 executes all instructions in the program including the instructions executed by the pre-operation unit 981. The same data as those stored in the IGPR 60 as the operation result of the pre-operation unit 981 are stored in the GGPR 4050 as the operation result of the main operation unit 4030. Numeral 4100 in the E-unit 2 denotes a decoder which decodes if the microinstruction loaded in the register 1001 specifies the storing of the operation result into the GGPR 4050. The decoded result is set in a flip-flop 4101 and supplied to the GGPR 4050 as a write enable signal.

Numeral 22 denotes a decoder which decodes if the microinstruction loaded in the register 1001 specifies the storing of the operation result into the IGPR 60. The decoded result is set in a flip-flop 4102 and supplied to the IGPR 60 through a line 100 as a write control signal. Numeral 5000 denotes a flip-flop in which a decision result by the decision circuit 902A for the instruction from the instruction queue 903 is set. The decision result set in the flip-flop 5000 is sent to the X/B conflict detector 3 of the I-unit 1 through a line 5000A and it is also set in a flip-flop 5010, thence it is sent to the X/B conflict detector 3 through a line 5010A.

Before describing the detail of the operation of the present embodiment, the characteristic construction and operation of the present embodiment are briefly explained. In the present embodiment, when the interruption occurs, it is detected by the E-unit 2 which suppresses the predetermined stage of the interrupting instruction or the next instruction and sends an interrupt signal to the I-unit 1 to suppress the stages of the succeeding instructions. In the E-unit 2, a start address of a microinstruction for writing the contents of the GGPR 4050 into the IGPR 60 is loaded in the register 1000 during the interruption processing. In response thereto, the instructions to write the contents of the GGPR 4050 into the corresponding IGPR 60 are sequentially loaded in the register 1001 from the control storage 1010. The register address of the GGPR 4050 designated by the instruction in accordance with the microinstruction loaded in the register 1001 is loaded in the register 3110 and the content of the GGPR of the designated address is read into the register 4200 through the register 4000 or 4010 and the main operation unit 4030. The register address loaded in the register 3110 is sent to the IGPR 60 through the registers 3110A and 9040 and the content of the register 4200 is written into the IGPR 60 of the designated address. The instructions for the general purpose registers loaded in the register 1001 are sequentially executed in this manner. As a result, when the interruption occurs, the contents of the IGPR 60 are changed to the contents of the GGPR 4050 in which the operation results are stored in the manner of the execution of the instructions in the sequence of the program.

The operation of the instruction execution in the present embodiment is now explained.

D-stage

A plurality of instructions are previously stored in the buffer 900 from the buffer memory 960. Each instruction is loaded to the instruction register 902 by the instruction partitioning circuit 901 prior to the start of the D-stage. If the instruction is of the RX format which generates one operand address from the index address, base address and the displacement, the index register address (X) and the base register address (B) are sent to the IGPR 60 through the lines 53 and 54, respectively, in the D-stage. The data GR(X) and GR(B) read from the IGPR 60 by the index register address X and the base register address B, respectively, and the displacement of the instruction are sent to the address adder 980 where an operand address is calculated. The first two bytes of the instruction (the leftmost one byte being the operation code) in the instruction register 902 are loaded to the instruction queue 903. The decision circuit 902A determines, based on the operation code in the instruction register 902, if the instruction can be processed only by the main operation unit 4030 and the operation result should be stored in the IGPR 60, and the decision result is paired with the first two bytes of the instruction in the instruction register 902 and the pair is stored in the instruction queue 903. If the decision is negative, the decision result is "1", as described before.

A-stage

For the RX format instruction, the operand address calculated by the address adder 980 in the D-stage is converted to a physical address for the buffer memory by the address control 950 in the A-stage, and the operand is fetched from the buffer memory 960 and it is stored in the operand buffer 970. The output of the operand buffer 970 is selected by the selector 840 and supplied to the pre-operation unit 981. In the A-stage, the first two bytes of the instruction from the instruction queue 903 is loaded to the register 904 and the register field of the instruction which represents the address (R1) of the IGPR 60 which stores the other operand to be used by the instruction is sent to the IGPR 60 through the line 55. The operand GR(R1) fetched from the IGPR 60 based on the address R1 is sent to the selector 850 through the line 820, selected by the selector 850 and supplied to the pre-operation unit 981. If the first two bytes of the instruction from the instruction queue 903 are of a format (RR format) which uses the data in two general purpose registers of the IGPR 60 as the operands, the other IGPR address (R2) for the other operand than the address (R1) is sent to the IGPR 60 through the line 56, and the operand GR(R2) read out based on the address R2 is sent to the selector 850 through the line 830 and selected by the selector 850 and supplied to the pre-operation unit 981. A microcode for specifying a start address of a microprogram for the microprogram processing in the subsequent E-stage is sent from the instruction queue 903 to the E-unit 2 through the output line 30. The first byte of the instruction which contains the read and write addresses for the GGPR 4050 is sent to the E-unit 2 through the line 31. The decision result of the decision circuit 902A from the instruction queue, which is used as an IGPR write request signal in the P-stage is sent to the E-unit 2 through the line 31A. The storing of those signals sent to the E-unit 2 into the registers in the E-unit 2 is carried out in the next stage.

L-stage

If the instruction loaded in the register 904 can be operated by the pre-operation unit 981, the operands GR(R1) and GR(R2) read from the IGPR 60 in the A-stage are operated by the pre-operation unit 981 and the operation result is loaded in the register 982. The two operands are also sent to the registers 4000 and 4010 in the E-unit 2 through the lines 20 and 21. The write register address in the bits 8–11 of the instruction loaded in the register 904 is loaded in the register 9040 through the line 800.

In the E-unit 2, the start address of the microprogram sent from the instruction queue 903 through the line 30 in the A-stage is loaded to the address register 1000 and the microinstruction is fetched from the control storage 1000 and supplied to the register 1001. The first byte of the instruction sent from the instruction queue 903 through the line 31 in the A-stage is loaded to the register 3100.

The decision result of the decision circuit 902A sent from the instruction queue 903 through the line 31A in the A-stage is set in the flip-flop 5000.

E-stage

In the I-unit 1, the operation result loaded in the register 982 by the write register address on the line 52 of the register 9040 is stored in the IGPR 60 through the line 50. In the E-unit 2, the operands sent from the selectors 840 and 850 through the lines 20 and 21 in the L-stage are loaded to the work registers 4000 and 4010 and they are operated by the operation unit 4030 under the control of the microinstruction, and the operation result is stored in the register 4040. The write register field (for the RX format instruction, the bits 8–11 of the register 3110 are the write address) which represents the write address in the first byte of the instruction from the instruction queue 903 representing the content of the register 3110 loaded in the L-stage is sent to the comparator 904A of the I-unit 1 through the line 11 and loaded in the register 9041 of the I-unit 1 in the E-stage. The decision result of the decision circuit 902A set in the flip-flop 5000 is set in the flip-flop 5010 in the E-stage and sent to the GPR write control 70 in the I-unit 1 through the line 5010A. The microinstruction fetched in the L-stage is loaded in the register 1001. As explained before, the microprogram instructions are sequentially fetched into the register 1001, and after the microprogram for the instruction loaded in the register 1000 has been completed, the next instruction is loaded in the register 1000 from the instruction queue 903. If the instruction which requires the GGPR write is loaded in the register 1000 and if the microinstruction which requires the storing of the operation result into the GGPR is loaded in the register 1001, the content of the instruction is decoded by the decoder 4100 through the output line 1013 and the decoded result is set in the flip-flop 4101 and sent out through the line 58 as a write enable signal to the GGPR 4050. If the instruction which cannot be operated by the pre-operation unit 981 is loaded in the register 1000 and if the microinstruction identifying the IGPR write in the microprogram corresponding to the instruction is loaded in the register 1001, the identification information is decoded by the decoder 4200 through the output line 1002 and the decoded result is set in the flip-flop 4102 and sent to the IGPR 60 of the I-unit 1 through the line 100 as the IGPR write signal.

P-stage

In the P-stage, the operation result in the E-unit 2 is loaded in the register 4020 from the register 4040 under the control of the microinstruction and it is sent to the GGPR 4050 through the line 4020A. If the instruction cannot be operated by the pre-operation unit 981, the operation result is sent to the GGPR 4050 and the output of the register 4020 is sent to the IGPR 60 of the I-unit 1 through the line 10 as the data to be stored in the IGPR 60. The data from the register 4020 is stored in the IGPR 60 in response to the IGPR write signal sent from the flip-flop 4102.

The occurrence of the index/base register conflict is detected by the X/B conflict detector 3, which suppresses the D-stage through the line 3A. A detail of the operation will be explained with reference to FIG. 6.

The outlines of the operations of the five stages D, A, L, E and P stages, of the present embodiment equipped with the pre-operation unit have thus been described.

FIG. 4 shows a detail of the IGPR 60 of FIG. 2 which is a characteristic feature of the present invention. The write and read operations of the general purpose registers of the IGPR 60 are now explained with reference to FIG. 4.

As described above, in the D-stage the data in the index register and the base register are read, and in the A-stage the operands R1 and R2 are read. Since the D-stage for the current instruction and the A-stage for the preceding instruction are overlapped in time by the pipeline system, the four registers of the IGPR 60 which contain the data of the index register, the base register, the operand R1 and the operand R2 are simultaneously read out. A detail of the operation is now explained with reference to FIG. 4.

The IGPR 60 include sixteen general purpose registers 8000–8015 (GPR0–GPR15) outputs of which are connected to multiplexers (MPX) 53A, 53B, 53C and 53D. The MPX 53A selects one of the general purpose registers by the index register address X supplied from the instruction register 902 through the line 53 and sends the content of the selected register to the address adder 981 through the line 800 as the data R(X). Similarly, the MPX 53B selects one of the general purpose registers by the base register address B designated by the instruction register 902 through the line 54 and sends the content of the selected register to the address adder 981 through the line 810 as the data R(B), the MPX 53C selects one of the general purpose registers by the register address R1 supplied from the instruction queue 903 through the line 55 and sends the content of the selected register to the selector 850 through the line 820 as the data R(1), and the MPX 53D selects one of the general purpose registers by the register address R2 supplied from the instruction queue 903 through the line 56 and sends the content of the selected register to the selector 840 through the line 830 as the data R2. In this manner, the contents of the four general purpose registers of the IGPR 60 can be independently read out.

As described above, the operation result for the instruction which can be operated by the pre-operation unit 981 is stored in the IGPR 60 in the E-stage and the operation result for the instruction which cannot be operated by the pre-operation unit 981 is stored in the IGPR 60 in the P-stage.

Since the E-stage for the current instruction and the P-stage for the preceding instruction are overlapped in time by the pipeline system, it is necessary to simultaneously write the data in the general purpose registers of the IGPR 60 in the E-stage and the P-stage. The construction and the operation therefor are now explained. In the P-stage, the write data from the register 4020 of the E-unit 2 is sent to the GPR's 8000–8015 through the line 10. Similarly, the write data from the pre-operation unit 981 is sent to the GPR's 8000–8015 through the line 50. The GPR address supplied from the register 3100 of the E-unit 2 through the register 9041 is sent to the decoder 61 shown in FIG. 4 through the line 51 and decoded thereby, and the decoded data is sent to the lines 630–645 through an AND gate which receives the IGPR write signal from the flip-flop 4102 of the E-unit 2. In the E-stage, the GPR address which represents the write address for the operation result of the pre-operation unit 981 is sent to the decoder 62 of FIG. 4 through the line 52 and decoded thereby, and the decoded data is sent to the lines 650–665 through an AND gate which receives the IGPR write enable signal from the GPR write control 3 through the line 700. The write signal in the P-stage on the line 630 and the write signal in the E-stage on the line 650 are sent to the line 530 through an OR gate to produce a set signal to the GPR 8000. The signals on the lines 631–645 and the signals on the lines 651–665, respectively, are also sent to the lines 531–545, respectively, through OR gates to produce set signals to the GPR's 8001–8015. Whether the date on the line 10 or the line 50 is supplied to the GPR 8000 is designated by the signal on the line 630. If the signal on the line 630 is "1", the signal on the line 10 is selected, and if it is "0" the signal on the line 50 is selected. For the GPR's 8001–8015, the input data are selected by the signals on the lines 631–645. In this manner, the data can be simultaneously written in the general purpose registers of the IGPR 60 in the E-stage for the current instruction and the P-stage for the preceding instruction.

Figure 5:
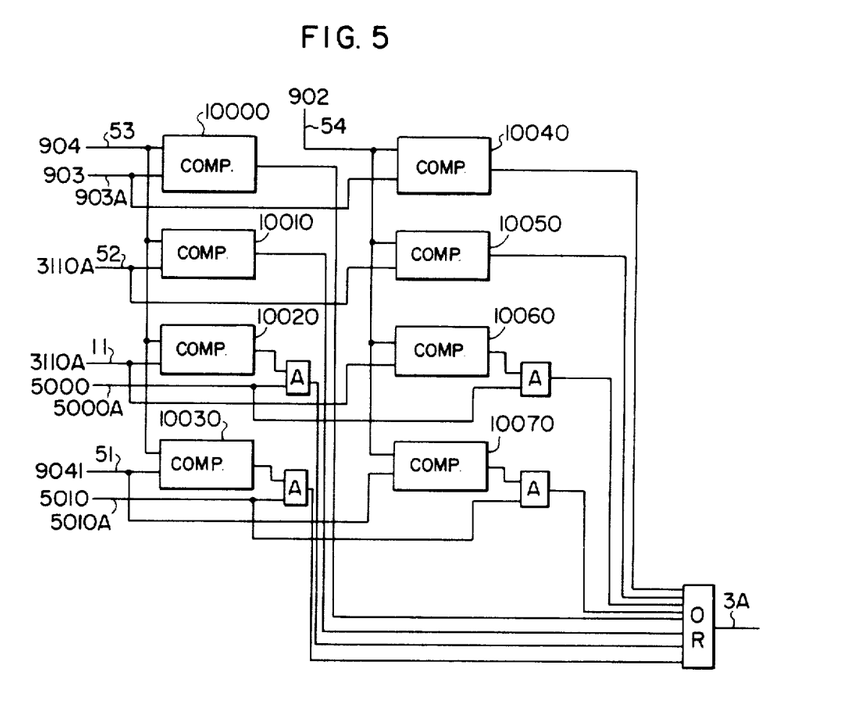
FIG. 5 shows a detail of an X/B conflict detector shown in FIG. 1.
Figure 6:
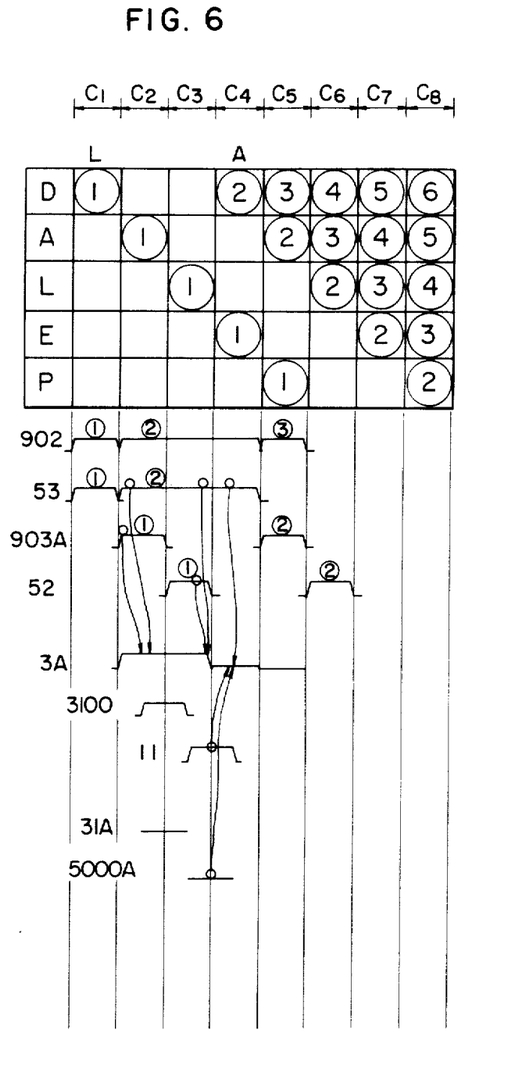
FIG. 6 illustrates instruction execution in the first embodiment of the present invention.
Figure 7:
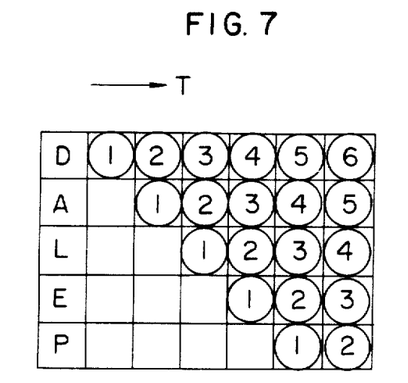
FIG. 7 illustrates instruction execution where the index/base register conflict does not occur in the pipelined data processing system.

The operation when the index/base register conflict occurs is now explained with reference to FIGS. 1, 5, 6, 7 and 8. FIG. 5 shows a detail of the X/B conflict detector 3 in the I-unit 1 and FIG. 6 shows a flow chart for the pipeline therefor. D, A, L, E and P represent the respective stages and an abscissa represent a time in machine cycle unit. Each machine cycle is divided by four clocks, each designated by $T_0$, $T_1$, $T_2$ and $T_3$. In the following description for the instruction, when a machine cycle Ci is for a certain stage, for example, D-stage of the machine cycle, a clock Ti for the machine cycle is designated in combination with the stage such as clock (D, Ti). Numbers ①-⑤ in FIG. 6 represent the instruction numbers to be processed. In FIG. 7, ① represents an L (load)-instruction, and ② represents an A (add)-instruction. The write register number R1 for ① and the index register number R2 for ② are equal and hence the index register conflict occurs.

Figure 8:
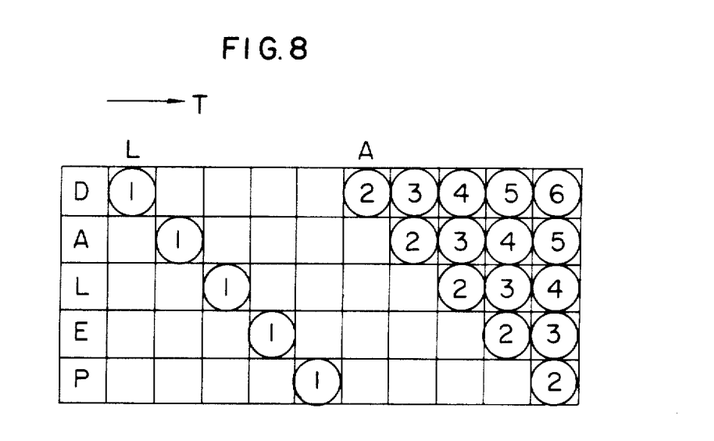
FIG. 8 illustrates instruction execution where the index/base register conflict occurs in the pipelined data processing system.

For the purpose of comparison, FIG. 7 shows a pipeline flow where the index register conflict does not occur and FIG. 8 shows a pipeline flow for the prior art system where the index register conflict occurs and the pre-operation is not carried out.

Since the L-instruction ① can be operated by the pre-operation unit 981, the operation result can be stored in the IGPR 60 in the E-stage. Accordingly, the D-stage for the A-instruction ② can be processed in overlap with the E-stage for the L-instruction ① and the operand address necessary for the A-instruction can be obtained. As a result, to compare with FIG. 9, the D-stage for the A-instruction ② can be initiated two cycles earlier.

The operation is described in further detail. The L-instruction ① is loaded in the instruction register 902 at a clock $T_0$ (D, $T_0$) in cycle $C_1$. Since the L-instruction ① can be operated by the pre-operation unit 981, the output "0" from the decision circuit 902A is loaded in the instruction queue 903 at a clock $T_0$ (A, $T_0$) in cycle $C_2$. The first two bytes of the instruction register 902 are also loaded in the instruction queue 903 at the clock $T_0$(A, $T_0$). At a clock $T_0$ of the cycle $C_2$, the A-instruction ② is loaded in the instruction register 902. The index field X and the base field B of the A-instruction ② are sent from the instruction register 902 to the X/B conflict detector 3 through the lines 53 and 54. At the same time, the write register member R1 of the L-instruction ① is sent from the instruction queue 903 to the X/B conflict detector 3 through the line 903A. In the X/B conflict detector 3 which is shown in detail in FIG. 5, the index field of the A-instruction ② from the instruction register 902 and the register number R1 of the L-instruction ① from the instruction queue 903 are compared by a comparator 10000. Since the addresses are equal in the present example, the output of the comparator 10000 passes through an OR gate and renders the D-stage suppress signal 3A to "1". By this signal, the processing in the D-stage for the A-instruction ② at the cycle $C_2$ is suppressed and the update of the instruction register 902 is suppressed.

At the clock $T_2$ (A, $T_2$) in the cycle $C_2$, the first two bytes of the L-instruction ① including the write address R1 are loaded in the register 904. The four bits of the register 904 including the write address R1 are loaded in the register 9040 at a clock $T_0$ (L, $T_0$) in cycle $C_3$.

Since the processing in the D-stage for the A-instruction ② is suppressed and the instruction register 902 is not updated in the cycle $C_2$, the data X and B of the A-instruction ② are sent to the lines 53 and 54 at the clock $T_0$ of the cycle $C_3$. At the same time, the write address R1 of the L-instruction ① is sent from the register 9040 to the line 52. Accordingly, a comparator 10010 of the X/B conflict detector 3 compares the index field of the A-instruction ② from the instruction register 902 on the line 53 and the address R1 of the L-instruction ① from the register 9040 on the line 52. Since the addresses are equal in the present example, an output of the comparator 10010 passes through an OR gate to render the D-stage suppress signal 3A to "1". This signal is sent to a stage control circuit, not shown to suppress the D-stage so that the D-stage for the A-instruction ② in the cycle $C_3$ is suppressed.

At a clock $T_2$ (A, $T_2$) of the cycle $C_2$, the output of the decision circuit 902A representing the IGPR write request in the P-stage is sent to the E-unit 2 through the line 31A and it is set in the flip-flop 5000 at a clock $T_2$ (L, $T_2$) in the cycle $C_3$ and sent to the I-unit 1 through the line 5000A.

At a clock $T_0$ (A, $T_0$) of the cycle $T_2$, the write address R1 of the L-instruction ① is sent to the E-unit 2 through the line 31, and at a clock $T_0$ (L, $T_0$) of the cycle $C_3$, it is loaded in the register 3110 and the bits 8–11 of the register 3110, that is, the address R1 of the L-instruction ①, are loaded in the register 3110A, and at a clock $T_2$ (L, $T_2$) of the cycle $C_3$ they are sent to the I-unit 1 through the line 11.

In the cycle $C_3$, the D-stage for the A-instruction ② is again suppressed and X and B of the A-instruction ② are sent to the lines 53 and 54 at a clock $T_0$ of cycle $C_4$.

At the same time, the write address R1 of the L-instruction is sent to the line 11 and the comparator 10020 of the X/B conflict detector 3 compares the register address R1 of the L-instruction from the register 3110A on the line 11 and the index field of the A-instruction from the instruction register 902 on the line 53. In this case, the addresses are equal and the IGPR write request signal supplied from the flip-flop 5000 through the line 5000A in the P-stage is "0". Therefore, the compare result is suppressed by the AND gate and the D-stage suppress signal 3A is "0". Accordingly, the D-stage for the A-instruction ② is processed in the cycle $C_4$.

The L-instruction ① can be operated by the pre-operation unit 981 but if the instruction ①, cannot be operated by the pre-operation unit 981 the IGPR write request signal supplied from the flip-flop 5000 in the P-stage is "1" and the D-stage suppress signal 3A is "1" in the cycle C$_4$ so that the operation in the D-stage is suppressed. In the cycle C$_5$, the IGPR write request signal supplied from the flip-flop 5010 through the line 5010A in the P-stage is "1" and the D-stage suppress signal 3A is "1" so that the operation in the D-stage is suppressed. In the cycle C$_6$, the D-stage for the instruction ② is first processed. In this case, the pipeline flow is same as that shown in FIG. 8.

The index register has thus been described in connection with the comparators 10000-10030 as to the base register 54, the addresses are compared by the comparators 10040-10070 and the D-stage suppress signal 3A is rendered to "1" as required in the same manner as for the index register.

In this manner, when the instruction ① can be operated by the pre-operation unit 981, the performance for the index register conflict is improved by two cycles to compare with a case where the index/base register conflict shown in FIG. 7 does not occur and the pre-operation of FIG. 8 is not carried out.

The method and operation for resolving the problem encountered by the interruption when the pre-operation unit is used are now explained.

Figure 9:
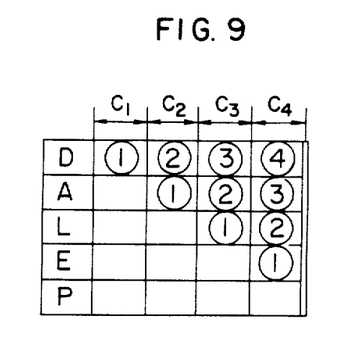
FIG. 9 illustrates instruction execution where the suppress type interruption occurs.

FIG. 9 shows a flow of instructions when the suppress type interruption occurs. It is assumed that the suppress type interruption occurs by the instruction ①. When the E-unit 2 detects the suppress type interruption at the E-stage of the instruction ①, the E-unit 2 suppresses the P-stage of the instruction ① and supplies an interrupt signal (not shown) to the I-unit 1 to suppress the D, A, L and E-stages of the succeeding instruction. Thus, the stages of the cycle C$_5$ and the following cycles are suppressed. Since the E-stage of the instruction ① has been completed, if the instruction ① was pre-operated by the pre-operation unit 981, the operation result of the instruction ① has been stored in the IGPR 60 in the E-stage. However, the storing of the operation result by the main operation unit 4030 into the GGPR 4050 is to be done in the P-stage and the P-stage of the instruction ① is suppressed by the interruption. Accordingly, the content of the GGPR 4050 is not updated by the operation result of the instruction ①.

The E-unit 2 forces the register 1000 to be set to a start address in an interruption processing program while the stages are suppressed so that the interruption processing program is started. The characteristic feature of the present invention is to add the following operation in the interruption processing program. When the instruction ① can be operated by the pre-operation unit 980, the content of the IGPR has been updated as described above because the E-stage of the instruction ① was completed and the instruction ① overruns by one instruction. For the suppress type interruption, the content of the IGPR 60 should not be updated by the operation result of the interrupting instruction, or the instruction ① in the present example but it is actually updated. This problem can be resolved in the interruption processing program by updating all of the contents of the IGPR 60 by the contents of the GGPR 4050. This is done in the following manner.

In FIG. 2, the read address of the general purpose register of the address 0 (corresponding to the GPR 0 in FIG. 4) of the GGPR 4050 is designated by a microinstruction. The GPR read address loaded in the register 1001 by the microinstruction is loaded in two register address fields R1 and R2 of the register 3110 through a line 8800. One (R2 field) of the register field addresses is sent to the GGPR 4050 as a read address. In response thereto, the data is read from the GGPR 4050 and it is loaded in the register 4020 through the register 4000 or 4010, the main operation unit 4030 and the register 4040. The other (R1 field) of the register address fields of the register 3110 is loaded in the register 3110A and then it is sent to the IGPR 60 of the I-unit 1 through the line 11 as a write address for the IGPR 60. The data read from the GGPR 4050 and loaded in the register 4020 is sent to the IGPR 60 of the I-unit 1 through the line 10 as a write data for the IGPR 60. The IGPR write command is designated by a microinstruction, loaded in the register 1001 and decoded by the decoder 4200 and the decoded result is set in the flip-flop 4102, thence sent to the IGPR 60 of the I-unit 1 through the line 100. Thus, the I-unit 1 writes the data read from the general purpose register of the address 0 of the GGPR 4050 into the general purpose register of the address 0 of the IGPR 60. The addresses of the general purpose registers of the address 1 and the following addresses of the GGPR 4050 are generated by updating the content of the register 3110 and the reading of the data of the GGPR 4050 and the writing of the data into the IGPR 60 are repeated by using the updated addresses. In this manner, all of the contents of the GGPR 4050 are written into the IGPR 60.

Figure 10:
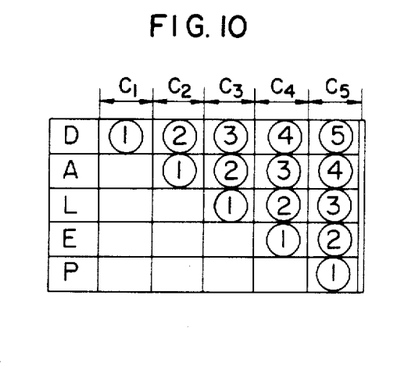
FIG. 10 illustrates instruction execution where the competion type interruption occurs.

FIG. 10 shows a flow of instructions when the completion type interruption occurs at the instruction ①. As shown, the P-stage of the instruction ② next to the instruction ① is suppressed and the interrupt signal is supplied to the I-unit 1 to suppress the D, A, L and E-stage of the succeeding instructions. In this case, the stages in the cycle C$_6$ and the following cycles are suppressed. Since the E-stage of the instruction ② has been completed, if the instruction ② can be pre-operated, the content of the IGPR 60 has been updated by the operation result of the instruction ②, but since the P-stage of the instruction ② is suppressed, the instruction ② is not operated by the main operation unit 4030 and the content of the GGPR 4050 is not updated by the operation result of the instruction ②. Like in the case of the suppress type interuption, the contents of the IGPR 60 are updated by the contents of the GGPR 4050. The termination type interruption can be processed by either one of the above two types of processing.

Figure 11:
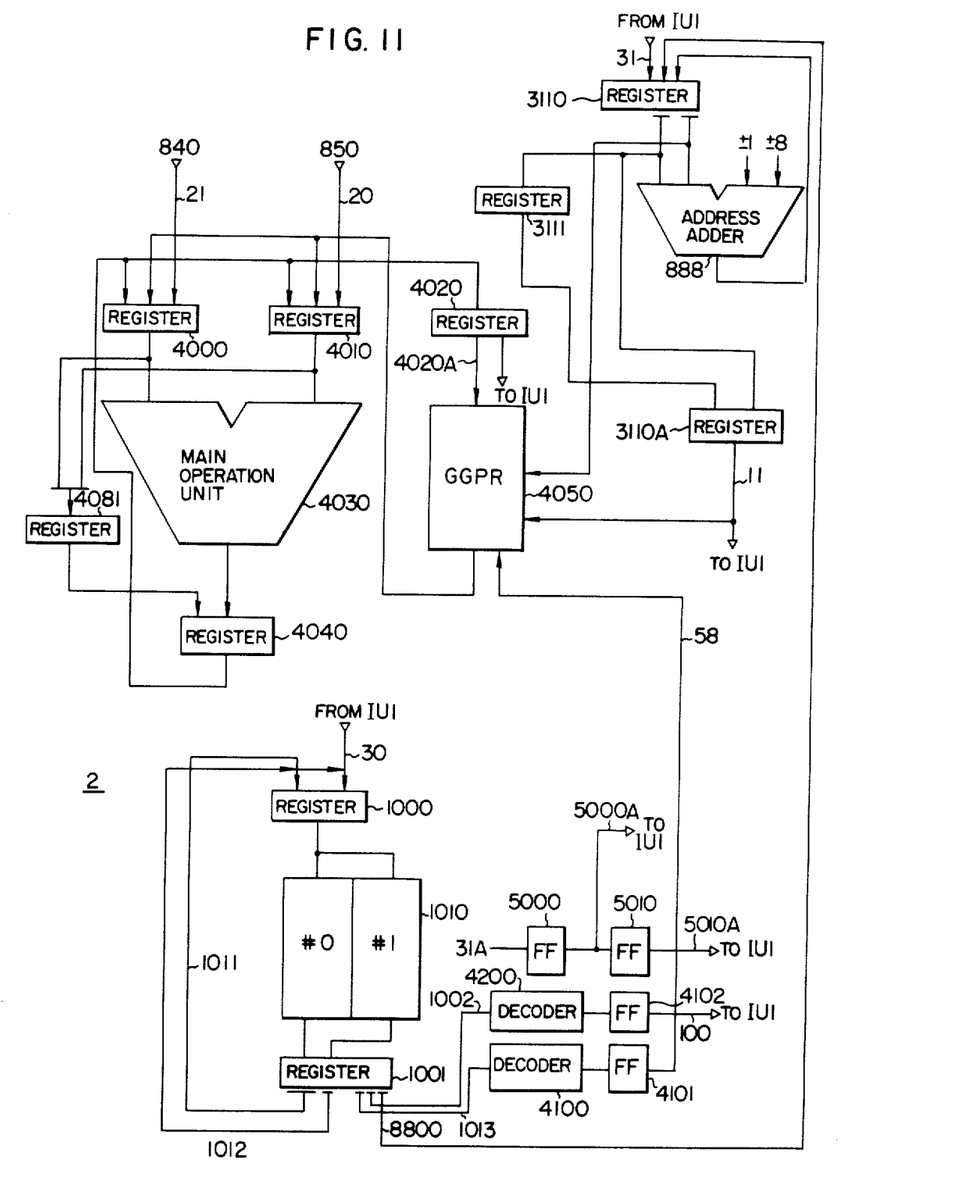
FIG. 11 shows a detail of an execution unit in another embodiment of the present invention.

A second embodiment for resolving the problem encountered by the interruption is now explained. A different operation from that described above is explained here. The content of the GPR before it is updated is previously evacuated. The evacuation is done in the following manner. In FIG. 1, the content of the IGPR before updating is read in the A-stage. This is well-known technique carried out in retrying the instruction in, for example, the Hitachi HITAC-M-180 computer and it can be carried out by the circuit of FIG. 1. For the L-instruction, for example, the write address R1 is sent from the instruction register 902 to the IGPR 60 through the line 55 in the A-stage so that the content of the IGPR 60 designated by the address R1 before the operation result is written is sent out to the line 820. It can be sent to the E-unit 2 from the IGPR 60 through the line 20. For the E-unit 2, the construction of FIG. 11 instead of FIG. 2 is needed. In FIG. 11, the content of the register 3110 including the write address is evacuated to the register 3111 in the E-stage. The data from the IGPR 60 before updating is loaded in the register 4010 of the E-unit 2 through the line 20. In the E-stage, the content of the register 4010 is evacuated to the register 4081. As a result, the content of the IGPR 60 designated by the address R1 before the operation result is written into the IGPR 60 is evacuated.

In this manner, the data of the IGPR 60 before it is updated by the operation result is evacuated into the register 4081 and the address thereof is evacuated into the register 3111.

The operation when the suppress type interruption occurs at the instruction ① is now explained. The stages are suppressed in the same manner as FIG. 9 and the interruption processing microprogram is started in the same manner. However, unlike the first embodiment, the interruption processing microprogram does not update the contents of the IGPR's by the contents of the GGPR's but the content of the register 3111 is read into the register 3100 and it is sent to the IGPR 60 of the I-unit 1 as the IGPR write address through the register 3110, the register 3110A and the line 11. The evacuated data is read from the register 4081 and it is sent to the IGPR 60 of the I-unit 1 through the register 4040, the register 4020 and the line 10. Like in the first embodiment, the write command is sent to the IGPR 60 of the I-unit 1 through the register 1001, the decoder 4200, the flip-flop 4102 and the line 100. In this manner, the evacuated data is written into the IGPR 60. Those operations are carried out by microinstructions.

When the completion type interruption occurs at the instruction ①, the operation of the interruption processing microprogram is same and it is not explained here.

From the above two embodiments, it is apparent that the contents of the GPR's can be changed to those expected by the program when the interruption occurs.

We claim:

1. A data processing system for executing each of a plurality of instructions in a plurality of stages in a pipeline mode, said system comprising:
means for sequentially decoding a plurality of instructions,
a plurality of first register means,
first operation means for executing sequentially operation of the decoded instructions, and writing result of operation of instructions other than a portion of instructions in the result of operation of the decoded instructions to said first register means,
second operation means for executing sequentially operation of said portion of instructions and writing the result of operation to said first register means, said second operation means executing operation of said portion of instructions before said portion of instructions are executed by said first operation means,
means for detecting an interruption, and
means for rewriting, when an interruption is detected, values in said first register means into which result of operation of a succeeding instruction executed by said second operation means has been already stored before execution of interrupted instruction is interrupted.

2. A data processing system according to claim 1, wherein said rewriting means comprises a plurality of second register means for storing result of operation of said first operation means, and means for making content of said first register means coincide with content of said second register means.

3. A data processing system according to claim 2, wherein said coincide means includes means for transferring contents of said plurality of second register means to corresponding register means in said plurality of first register means respectively.

4. A data processing system according to claim 1, wherein said rewrite means includes second register means for evacuating data in said first register means, said data being one before said data is rewritten by result of operation of said second operation means, means for storing an address which designates register means in said plurality of first register means, said register means being one in which the rewriting was made, and means for storing the evacuated data to the register means designated by said stored address when an interruption is detected.

5. A data processing system for executing each of a plurality of instructions in a plurality of stages in a pipeline mode, comprising:
means for sequentially decoding executable instructions to produce data necessary for the execution of the respective stages;
a first operation unit capable of carrying out operations required by a plurality of instructions;
first store means for storing data produced by the operation of the instructions by said first operation unit;
a second operation unit capable of carrying out operations required by a portion of said plurality of instructions;
second store means for storing data produced by the operation of the instructions by said second operation unit; and
control means for controlling execution of the instruction including means for storing the data produced by said second operation unit into said second store means at least one operation stage earlier than the storing of the data produced by said first operation unit into said first store means, means for detecting an interruption, and means responsive to the detection of the interruption for storing the content of said first store means into said second store means.

6. A data processing system for executing each of a plurality of instructions in a plurality of stages in a pipeline mode, comprising:
means for sequentially decoding executable instructions to produce data necessary for the execution of the respective stages;
a first operation unit capable of carrying out operations required by a plurality of instructions;
first store means for storing data produced by the operation of said instructions by said first operation unit;
a second operation unit capable of carrying out operations required by a portion of said plurality of instructions;
second store means for storing data produced by the operation of the instructions by said second operation unit;
means for evacuating the content of said second store means before the data produced by said second operation unit is stored in said second store means; and
control means for controlling the execution of the instructions including means for storing the data produced by said second operation unit into said second store means at least one operation stage earlier than the storing of the data produced by said first operation unit into said first store means, means for detecting an interruption, and means responsive to the detection of the interruption for restoring the evacuated content of said evacuation means to said second store means.

* * * * *

UNITED STATES PATENT AND TRADEMARK OFFICE
CERTIFICATE OF CORRECTION

PATENT NO. : 4,541,047
DATED : September 10, 1985
INVENTOR(S) : WADA, et al

It is certified that error appears in the above-identified patent and that said Letters Patent is hereby corrected as shown below:

Col. 2, line 14, delete "71217/82" and insert --71210/82--.

Signed and Sealed this

Thirtieth Day of May, 1989

Attest:

DONALD J. QUIGG

Attesting Officer

Commissioner of Patents and Trademarks